Patented Dec. 27, 1938

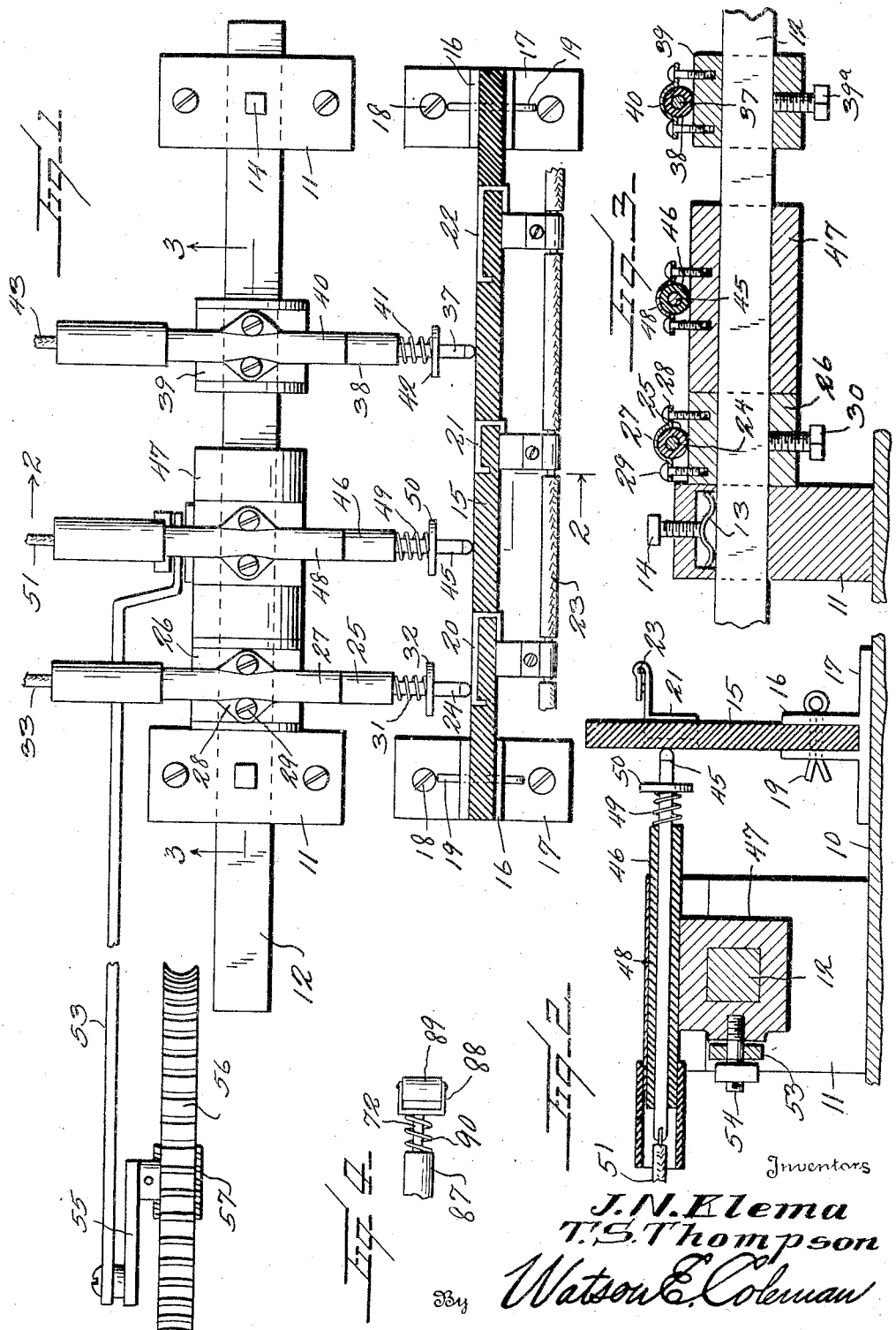

2,141,355

UNITED STATES PATENT OFFICE 2,141,355

SWITCH FOR TRAFFIC SIGNALS

Joseph N. Klema and Thaddeus S. Thompson, Austin, Minn.

Application May 4, 1937, Serial No. 140,746

5 Claims. (Cl. 200—23)

This invention has for its primary object to provide an improved signal switch having a reciprocable circuit closing means which is adapted to close predetermined circuits to a signal operating system and maintain the signals in operation for predetermined periods.

Another object of this invention is to provide a slidable wiper which is movable relative to a plurality of additional wipers so that when the reciprocable operating means arrives at the end of each stroke, the remaining wipers will be stationary for a short period of time after which the movable wiper will contact with one of the stationary wiper supporting means to move all of the wipers in unison toward the other end of the stroke.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a fragmentary top plan partly in section of my improved switch.

Figure 2 is a sectional view taken on the line 2—2 of Figure 1.

Figure 3 is a sectional view taken on the line 3—3 of Figure 1.

Fig. 4 is a detailed fragmentary view of a modified form of wiper hereinafter specifically described.

Referring to the drawing, the numeral 10 designates generally a base of suitable size which is provided at spaced apart points thereon with a pair of upstanding guide members 11 in which a bar 12 is slidable. The bar 12 is frictionally held against movement relative to the guide members 11 by means of springs 13 which are tensioned by bolts 14, the purpose for which will be hereinafter described.

A vertically disposed insulating board or panel 15 is secured to the base 10 by means of a pair of spaced apart vertical plates 16 which are carried by a base plate 17 secured, as by screws or bolts 18, to the upper surface of the base 10. Cotter pins 19 or other suitable securing means extend through the vertical plates 16 and through the panel 15 so as to detachably secure the panel 15 on the base 10. The panel 15 is provided with a plurality of contacts or terminals 20, 21 and 22, which are disposed in longitudinally spaced relation and these terminals 20, 21 and 22 are connected to a source of current supply by a common conductor or wire 23.

A spring pressed wiper 24 is slidable in an insulated tubular member 25 which is detachably clamped to a block 26 by means of a transversely arcuate clamping member 27, having outstanding ears 28, through which securing bolts 29 pass to tightly hold the insulating tube 25 on the block 26. The block 26 is fixedly secured against movement longitudinally of the bar 12 by means of a set screw 30 or the like. The wiper 24 is slidable in the tube 25 and is yieldably held against the panel 15 by means of a spring 31, which, at one end, engages against the adjacent end of the tube 25 and at the other end engages against a plate or fixed washer 32 carried by the wiper 24. The wiper 24 is adapted to be connected as by a conductor 33 to one side of a signal light (not shown), the other side of the light being connected as by a conductor to the other side of the source of electric current supply.

The wiper 24 is adapted in one movement of the bar 12 to engage the contact or terminal 20 and in the opposite movement of the bar 12 it is adapted to be moved out of engagement with the contact 20 and into engagement with the adjacent face of the insulating panel 15 so as to break the circuit leading to the signal light above mentioned. A second wiper 37 is slidably carried by an insulating tube 38 which is fastened to a block 39 secured on the bar 12 by a set screw 39a and is adapted to wipe across the contact or terminal 22. The clamping means 40 engaging the tube 38 is similar to the clamping means 27.

A spring 41 engages at its outer end against a plate 42 fixed to the wiper 37 and at its other end engages against the adjacent or outer end of the insulating tube 38, so as to constantly maintain the wiper 37 in contact with the panel 15 or the contact 22. A conductor 43 is connected at one end to the wiper 37 within the tube 38 and at the other end the conductor 43 is connected to one side of a second signal light not shown, the latter being connected at the other side to the conductor leading to the source of current supply.

The intermediate contact 21 is engaged by an intermediate and movable wiper 45 which is slidably carried by an insulating tube 46 clamped to a slidable block 47 by clamping means 48 similar to the clamping means 27. The wiper 45 is yieldably held against the adjacent face of the panel 15 and the contact 21 by means of a spring 49 which engages against a fixed washer or plate 50 and against the adjacent or outer end of the tube 46. The two blocks 26 and 39 are adjusted in spaced relation to each other by means of the set screws 30 and 39a. The movement of the intermediate or sliding block 47 is adapted to provide means whereby the wiper 45 may, at each end of the stroke of the sliding bar 12, contact with the terminal 21 at the same time that the adjacent wiper fixed to the bar 12 is in contact with its associated terminal. In this manner, where the wiper 24 is connected to a signal light having a green lens, the wiper 45, which is connected as by a conductor 51 say to a signal light associated with an amber light, will simultaneously light up the amber light or signal until the wiper 24 is disengaged from the contact or terminal 20. At the opposite end of the stroke of the bar 24, the wiper 37 will be engaged with the contact 22 and the wiper 45 will, upon the initial return stroke of the sliding block 47, move into engagement with the terminal or contact 21, while the wiper 37 is stationary and in contact with the terminal 22. The bar 12 is frictionally held against movement by the spring or brake member 13 carried by each guide member 11.

The bar 12 and the block 47 are reciprocated back and forth on the guides 11 by means of a pitman 53 which is connected at one end to a pin or pivotal member 54 secured to one side of the block 47. The opposite end of the pitman 53 is connected to an eccentric or crank 55 associated with a reduction gear 56 in the form of a worm gear. A worm 57 is adapted to engage the worm 56 and is rotated by means of a motor (not shown).

In the use of this device, the rotation of the gear 56 will effect reciprocation of the sliding member 47 and also the slide bar 12 in the guide members 11, assuming that the bar 12 is at the end of the stroke shown in Fig. 1 with the wiper 24 contacting with the terminal or contact 20, the light which is controlled by the wiper 24 will be lighted. As the crank 55 turns and the abutment 53 moves to the right, the sliding wiper carrying the block 47 will manifestly move initially to the right without any movement of the bar 12 until the block 47 contacts with the block 39. When the block 47 engages the block 39 manifestly the bar 12 will move therewith so that the wiper 24 will be moved off of the contact 20 and the wiper 37 will be moved into engagement with the contact 22. The wiper 45 will initially be in contact with the terminal 21 when the wiper 37 contacts with the terminal 22 but will move out of engagement therewith during the further movement to the right of the bar 12. No matter in which direction the block 47 is being moved, the initial portion of its movement is independent of any movement of the bar 12, but the final portion of its movement effects a corresponding movement of the bar 12 by the abutment of the block 47 against either one or the other of the blocks 26 and 39.

In Figure 4, there is disclosed a modified form of wiper which may be substituted for the wipers 24, 37 and 45. In this modified wiper construction, a rod 72 is slidable in an insulated tube 87, and the forward end of the rod 72 is forked as at 88. A roller 89 constructed of either metal or carbon or like material is rotatably disposed between the arms of the fork 88 and a spring 90 is interposed between the forward end of the tube 87 and the rear end or bight of the fork 88 so as to resiliently hold the roller 89 in engagement with the panel 15 and the contacts thereon.

If desired also the tips of the wipers 24, 37 and 45 may be formed of carbon which may be suitably secured in the forward ends of the wipers or rods 24, 37 and 45.

It is, of course, understood that various changes and modifications may be made in the details of construction and design of the above specifically described embodiment of this invention without departing from the spirit thereof, such changes and modifications being restricted only by the scope of the following claims.

We claim:—

1. A signal switch comprising a base, a pair of guide members carried by said base, a bar slidably engaging said guide members, a plurality of stationary contacts, a pair of wipers fixed to said bar and disposed in spaced relation, a movable wiper on said bar between said pair of wipers, and reciprocable operating means connected to said movable wiper.

2. A signal switch comprising a base, a pair of guide members carried by the base, a bar slidably engaging said guide members, a stationary panel, a plurality of spaced contacts carried by said panel, a pair of wipers secured to said bar in spaced apart relation, an intermediate wiper disposed between said pair of wipers, means slidably engaging the bar and the intermediate wiper to slidably secure the intermediate wiper on said bar, and reciprocable operating means connected to said latter means.

3. A signal operating means comprising a base, a bar disposed above the base, means carried by the base and slidably supporting the bar above the base, a stationary panel disposed in parallel relation to said bar, a plurality of spaced terminals carried by said panel, a pair of spaced spring pressed wipers, means securing said wipers in spaced relation to each other on said bar, an intermediate wiper disposed between said pair of wipers, a slide member engaging said bar between said pair of wipers, means securing said intermediate wiper to said slidable member, and reciprocable means connected to said slidable member and adapted upon operation thereof to initially move said slidable member between said pair of wipers, contact of said slidable member with one of the securing means for said pair of wipers effecting slidable movement of said bar.

4. A signal switch comprising a base, a pair of guide members carried by said base, a bar slidably engaging said guide members, a plurality of stationary contacts carried by said base, a pair of wipers fixed to said bar and disposed in spaced relation, a movable wiper on said bar between said pair of wipers, reciprocable operating means connected to said movable wiper, and means carried by said guide members engageable with said bar to frictionally hold said bar against sliding movement.

5. A signal switch comprising a base, a bar disposed above the base, means carried by the base and slidably supporting the bar above the base, a stationary panel disposed in parallel relation to said bar, a plurality of spaced terminals carried by said panel, a pair of spaced wipers, blocks carrying said wipers and mounted in spaced relation to each other on said bar in fixed relation to the latter, an intermediate wiper disposed between said first named wipers, a block carrying said intermediate wiper and slidably mounted on said bar, and reciprocable means connected to said sliding member and adapted to move said last mentioned block on said bar into alternate abutting relation to the first named blocks, as and for the purpose set forth.

JOSEPH N. KLEMA.
THADDEUS S. THOMPSON.